United States Patent [19]

Kozai et al.

[11] Patent Number: 4,536,649
[45] Date of Patent: Aug. 20, 1985

[54] PHOTOELECTRIC CONVERTER-TYPE PULSE ENCODER

[75] Inventors: Yoshinori Kozai, Hino; Yoichi Amemiya, Hachioji; Sunao Asahara, Hino, all of Japan

[73] Assignee: Fanuc Ltd., Tokyo, Japan

[21] Appl. No.: 438,846

[22] PCT Filed: Feb. 16, 1982

[86] PCT No.: PCT/JP82/00042
§ 371 Date: Oct. 18, 1982
§ 102(e) Date: Oct. 18, 1982

[87] PCT Pub. No.: WO82/02945
PCT Pub. Date: Sep. 2, 1982

[30] Foreign Application Priority Data

Feb. 16, 1981 [JP] Japan ................................. 56-20180

[51] Int. Cl.$^3$ ............................................. G01D 5/34
[52] U.S. Cl. .............................. 250/231 SE; 250/227; 340/347 P
[58] Field of Search ............ 250/227, 231 SE, 231 R, 250/237 G; 340/347 P; 350/96.25

[56] References Cited

U.S. PATENT DOCUMENTS

| | | | |
|---|---|---|---|
| 3,906,223 | 9/1975 | White | 250/231 SE |
| 4,152,589 | 5/1979 | Mitchell | 250/237 G |
| 4,236,070 | 11/1980 | Lee | 250/231 SE |
| 4,240,066 | 12/1980 | Lenox | 250/231 SE |
| 4,333,009 | 6/1982 | Stevens | 250/237 G |
| 4,342,025 | 7/1982 | Spalti et al. | 250/231 SE |
| 4,386,270 | 5/1983 | Ezekiel | 250/231 SE |
| 4,387,300 | 6/1983 | Dudash et al. | 250/237 G |
| 4,410,798 | 10/1983 | Breslow | 250/231 SE |
| 4,430,566 | 2/1984 | Searle | 250/227 |

Primary Examiner—David C. Nelms
Assistant Examiner—J. Gatto
Attorney, Agent, or Firm—Armstrong, Nikaido, Marmelstein & Kubovcik

[57] ABSTRACT

In a photoelectric converter-type pulse encoder comprising a light-entrance portion (13, 13'), a rotating slit plate (12) on which a lattice plate receiving light from the light-entrance portion (13, 13') is formed, a fixed slit plate (11) on which a lattice plate arranged to face the lattice plate of the rotating slit plate is formed, and a light-receiving portion (14, 14') arranged below the fixed slit plate, light is emitted from a light-emitting circuit to the light-entrance portion (13, 13') through the light fibers (17), and the light received by the light-receiving portion (14, 14') is introduced into a light-receiving circuit through the light fibers (17), thereby adjustment of the amount of light is made easier, the pulse generation in response to the rotating speed is ensured, and the rotating speed is detected with a high precision.

2 Claims, 13 Drawing Figures

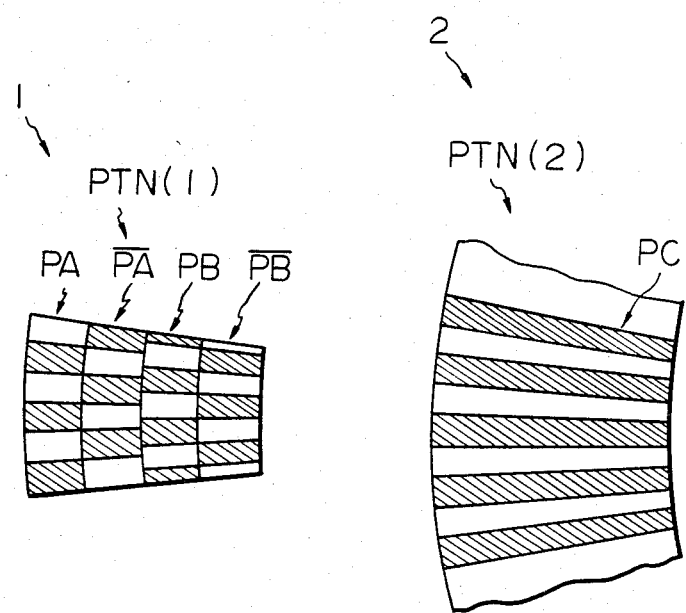
Fig. 2 (1)
PRIOR ART
Fig. 2 (2)
PRIOR ART

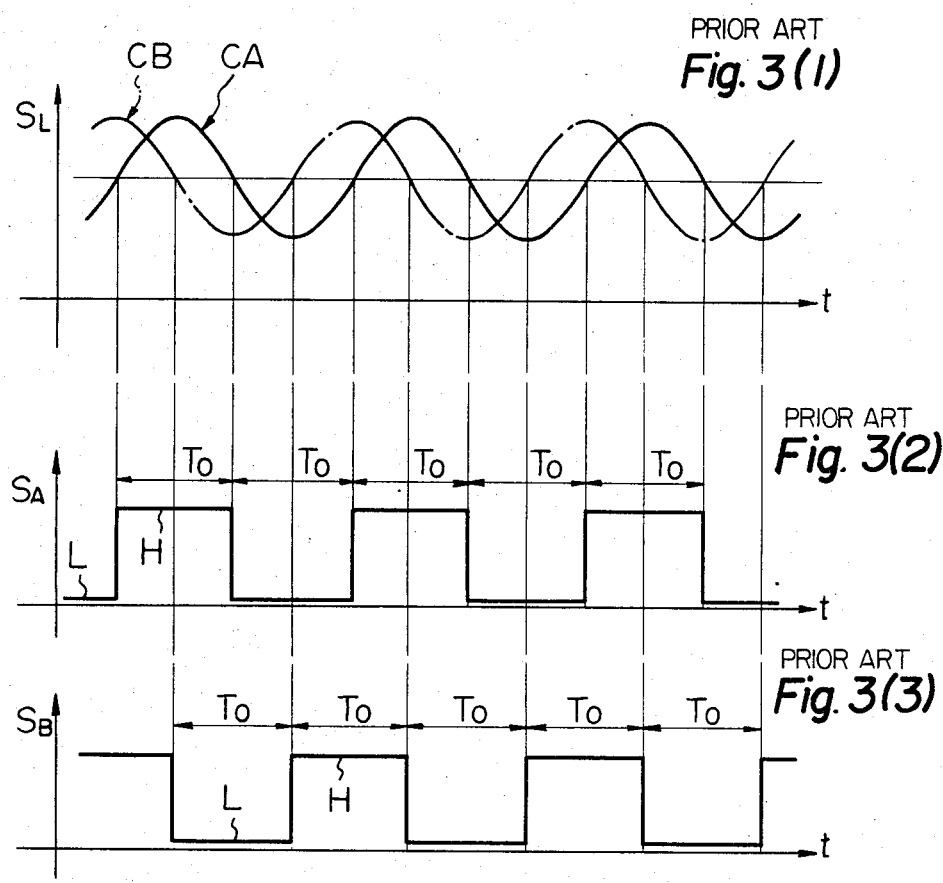

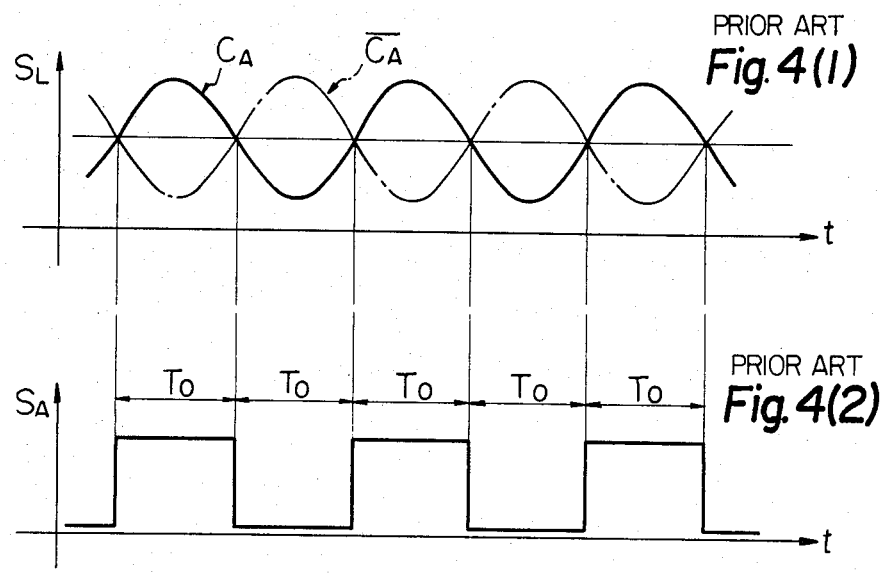
PRIOR ART
Fig. 4(1)
PRIOR ART
Fig. 4(2)
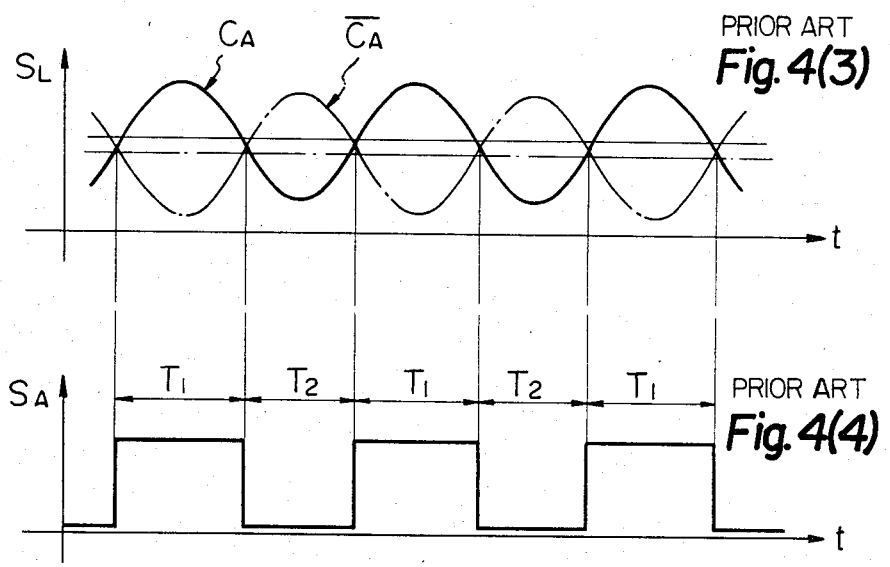
PRIOR ART
Fig. 4(3)
PRIOR ART
Fig. 4(4)

PHOTOELECTRIC CONVERTER-TYPE PULSE ENCODER

DESCRIPTION

Technical Field

The present invention relates to a photoelectric converter-type pulse encoder and more particularly to a photoelectric converter-type pulse encoder which comprises a light-entrance portion, a rotating slit plate on which a lattice plate receiving light from said light-entrance portion is formed, a fixed slit plate on which a lattice plate arranged to face said lattice plate of said rotating slit plate is formed, and a light-receiving portion arranged below said fixed slit plate.

The photoelectric converter-type pulse encoder according to the present invention may be used, for example, to detect the rotation of a servomotor in a numerical control unit for a machine tool.

BACKGROUND OF THE INVENTION

A photoelectric converter-type pulse encoder of a prior art is illustrated in FIGS. 1 and 2. In FIG. 1, a fixed slit plate 1, a rotating slit plate 2, light-emitting elements 3 and 3', light-receiving elements 4 and 4', a rotational shaft 5, a converter circuit 6, and electric signal lines 7 are shown. Lattice patterns PTN(1) and PTN(2) are formed on the fixed slit plate 1 and the rotating slit plate 2, respectively, as shown in FIG. 2. The lattice pattern PTN(1) has lattice pattern rows PA, $\overline{PA}$, PB, and $\overline{PB}$, and the lattice pattern PTN(2) has a lattice pattern row PC.

The light-emitting element 3 emits light through the pattern row PC of the rotating slit plate 2 and the pattern rows PA and $\overline{PA}$ of the fixed slit plate 1 to the light-receiving element 4 while the light-emitting element 3' emits light through the pattern row PC and the pattern rows PB and $\overline{PB}$ to the light-receiving element 4'. In the light-receiving elements 4 and 4', electric signals are produced in response to the intensity of the received light and are supplied to the converter circuit 6 through the electric signal lines 7.

The rotating slit plate 2 is able to rotate around the rotational shaft 5, and the amount of light emitted from the light-emitting elements 3 and 3' to the light-receiving elements 4 and 4' varies in response to the difference between the positions of the lattice patterns of the fixed slit plate and the rotating slit plate in accordance with the rotation of the rotating slit plate 2. Thus, the electric signals produced in the light-receiving elements 4 and 4' are altered sinusoidally.

In FIGS. 3 and 4, various signal waveforms are illustrated in order to explain the operation of the pulse encoder of FIG. 1. In the pulse encoder of FIG. 1, it is necessary to gain two rectangular pulse signals $S_A$ and $S_B$, the phase difference between these signals being 90° and the duty ratio between these signals being 1. However, it is difficult to gain the above-mentioned two pulse signals only by comparing two sine wave signals with a 90° phase difference to a reference value since it is extremely difficult to control the DC components of the signals obtained by the light-receiving elements 3 and 3' at constant values.

In order to solve the above-mentioned problem, in the pulse encoder of FIG. 1, a method is used in which, in order to gain a pulse signal $S_A$ of phase A, the two lattice pattern rows PA and $\overline{PA}$ are provided and two signals CA and $\overline{CA}$ with inverted phases are produced. These two signals CA and $\overline{CA}$ are adjusted so that they have the same DC components. Then these two signals are compared so that the pulse signal $S_A$ is produced. FIGS. 4(1) and 4(2) illustrate that a rectangular pulse signal with a duty cycle of 50% can be obtained by the above-mentioned method.

However, in the above-mentioned method, considerably troublesome adjustments are necessary in order to make the DC components of the two signals equal. That is, in order to match the light axes between the light-emitting elements and the light-receiving elements so as to equalize the distribution of light between the light-emitting elements and the light receiving elements, it is necessary to carry out the following adjustments:

(1) adjustment of the position of the light-emitting element so that the center of light distribution is on the borderline between the two lattice plates PA and $\overline{PA}$, (2) adjustment of the inclination of the light-emitting elements so as to equalize the distribution of light, (3) adjustment of the light distribution by the provision of a blind in front of the light-emitting elements so as to eliminate excess light.

The above-mentioned adjustments are very difficult to carry out, and, furthermore, it is very difficult to maintain these adjustments.

SUMMARY OF THE INVENTION

The main object of the present invention is to solve the problems of the prior art by supplying light from a light-emitting circuit to a light-entrance portion through light fibers and introducing light received by the light-receiving portion into a light-receiving circuit through light fibers in a photoelectric converter-type pulse encoder to make adjustment of the amount of light easier and to ensure the generation of pulses in accordance with the rotating speed of the rotating slit plate so as to detect the rotation with a high precision.

In accordance with the present invention, there is provided a photoelectric converter-type pulse encoder comprising a light-entrance portion, a rotating slit plate on which a lattice plate receiving light from said light-entrance portion is formed, a fixed slit plate on which a lattice plate arranged to face said lattice plate of said rotating slit plate is formed, and a light-receiving portion arranged below said fixed slit plate, wherein light is emitted from a light-emitting circuit to said light-entrance portion through light fibers and the light received by said light-receiving portion is introduced into a light-receiving circuit through light fibers.

BRIEF DESCRIPTION OF THE DRAWINGS

FIGS. 2(1) and 2(2) illustrates lattice patterns formed on the fixed slit plate and the rotating slit plate of the pulse encoder of FIG. 1.

FIGS. 3(1), 3(2) and 3(3), and 4(1), 4(2), 4(3) and 4(4) illustrate waveforms for explaining the characteristics of the pulse encoder of FIG. 1;

BEST MODE FOR CARRYING OUT THE INVENTION

Figure 5A:
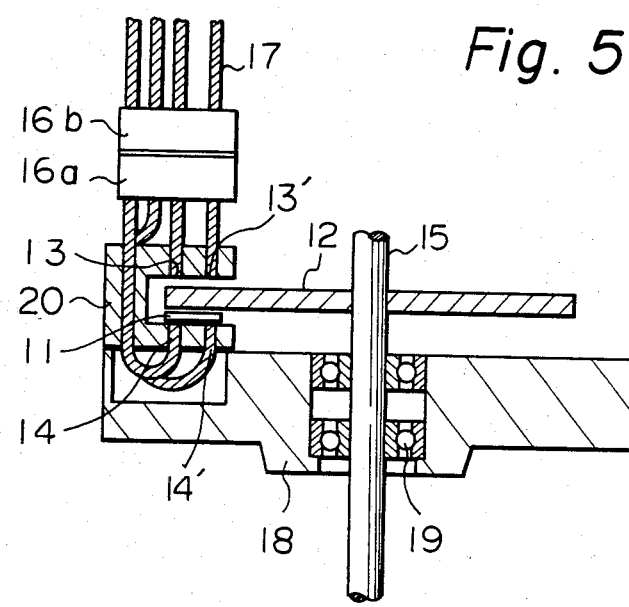
FIGS. 5(A) and 5(B) illustrates the construction of a photoelectric converter-type pulse encoder in accordance with one embodiment of the present invention.
Figure 5B:
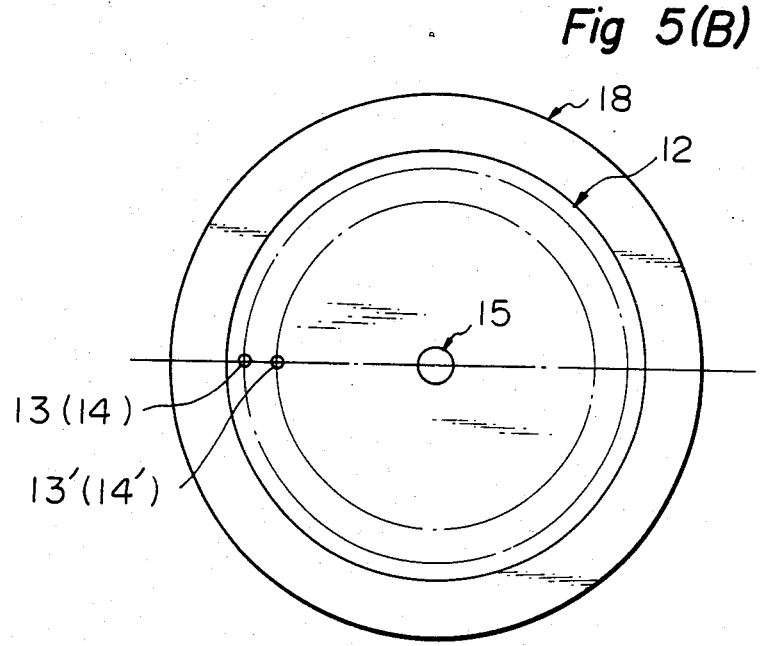

A pulse encoder in accordance with one embodiment of the present invention is illustrated in FIG. 5.

In the pulse encoder of FIG. 5, a fixed slit plate 11, a rotating slit plate 12, light-entrance portions 13 and 13', light-receiving portions 14 and 14', a rotational shaft 15, light connectors 16a and 16b, light fibers 17, a fixed support table 18, a bearing 19, and a fixing member 20 are shown. On the fixed slit plate 11 and the rotating slit plate 12, lattice plates as shown in FIG. 2 (1) and (2) are formed, respectively. The lattice plates of the fixed slit plate 11 and the rotating slit plate 12 are arranged to face each other. The light-entrance portions 13 and 13' are formed above the lattice plate of the rotating slit plate 12 as shown in FIG. 5, and the light-receiving portions 14 and 14' are formed below the lattice plate of the fixed slit plate 12.

The ends of the light fibers 17 transmitting the light emitted by the light-emitting circuit (not shown) are firmly attached to the light-entrance portions 13 and 13', and the ends of the light fibers 17 transmitting the received light to the converter circuit (not shown) are firmly attached to the light-receiving portions 14 and 14'. The light emitted from the light-entrance portions 13 and 13' to the lattice plates is received by the light-receiving portions 14 and 14', respectively. The light-entrance portions 13 and 13' and the light-receiving portions 14 and 14' are adjusted and fixed by the fixing member 20 so that the light axes of the light-entrance portions and the light-receiving portions coincide.

Figure 1A:
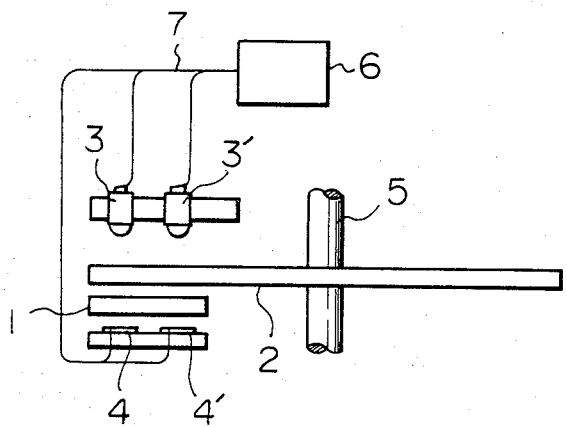
FIGS. 1(A) and 1(B) illustrates the construction of a photoelectric converter-type pulse encoder of a prior art.
Figure 1B:
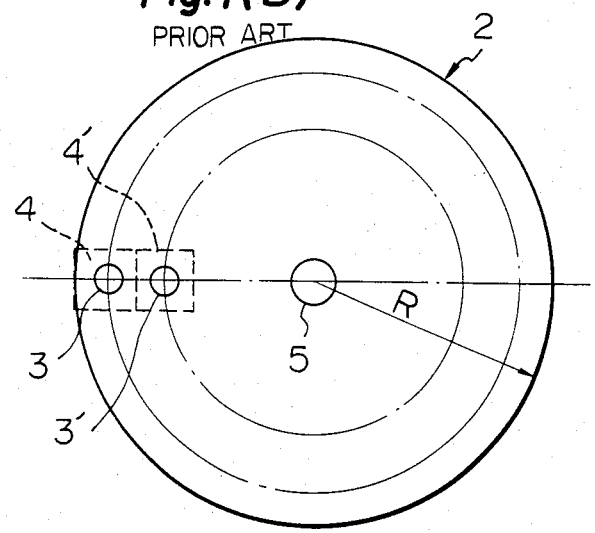

The operation of the pulse encoder of FIG. 5 is the same as that of the pulse encoder of FIG. 1 except that light is transmitted through light fibers. As described in the explanation regarding the pulse encoder of FIG. 1, it is necessary to adjust the light signals received by the light-receiving portions 14 and 14' so that the DC components of these signals are equal, the amplitude of the AC components of these signals is equal, and the phases of these signals are different by 90° or 180°.

In accordance with the pulse encoder of FIG. 5, since light fibers are used as the means for transmitting and emitting light, the mechanical axial direction and the light axial direction of the light fibers can be made to coincide readily and the light spot can be made small so that the above-mentioned adjustments can be carried out extremely readily.

According to the present invention, in the photoelectric converter-type pulse encoder, adjustment of the amount of light can be made easier and the pulse generation in response to the rotating speed of the rotating slit plate can be ensured and thereby the rotation of the rotating slit plate can be detected with a high precision.

We claim:

1. In a photoelectric converter-type pulse encoder comprising a light-entrance portion having a plurality of light emitting elements, a rotating slit plate having an encoding lattice formed thereon, a fixed slit plate having a lattice formed thereon and arranged to face said lattice of said rotating slit plate, and a light-receiving portion having a plurality of light receiving elements corresponding to said light emitting elements, the improvement comprising:

a light fixing member consisting of a unitary member positionable with respect to said slit plates and formed with two legs extending parallel to each other on opposite sides of said slit plates, said legs having a plurality of pairs of holes formed therein to provide corresponding light-entrance and light-receiving portions aligned respectively with each other so that the axes of respective holes in said light-entrance portion and light-receiving portion coincide; and pairs of light fibers extending through said holes and fixed in said light fixing member to provide respectively light emitting elements at said light-entrance portion and light receiving elements at said light-receiving portion, said pairs of light fibers having end surfaces respectively in facing relationship whereby respective light emitting and light receiving elements are fixed permanently in alignment.

2. The method of fixing in alignment light-entrance and light-receiving elements of a photoelectric encoder comprising fixed and rotatable slit lattice plates, said method comprising:

providing a unitary light fixing member having parallel legs extending parallel to each other on opposite sides of said plates; forming a plurality of pairs of holes in said legs, said holes of each pair having their respective axes aligned to provide respectively a light-entrance portion and a light-receiving portion; and fixing light fibers in said holes with end surfaces in facing relationship to provide, respectively, light emitting elements in said light-entrance portion and light receiving elements in said light-receiving portion.

* * * * *